(12) United States Patent
Sheth et al.

(10) Patent No.: US 8,036,759 B2
(45) Date of Patent: Oct. 11, 2011

(54) ONLINE MODULAR PARAMETERIZATION AND SUCCESSIVE LINEAR PROGRAMMING FOR IMPROVING MANUFACTURING PLANT OPERATIONS

(75) Inventors: Kiran R. Sheth, Sugar Land, TX (US); R. Donald Bartusiak, Houston, TX (US); Robert W. Fontaine, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 667 days.

(21) Appl. No.: 12/112,339

(22) Filed: Apr. 30, 2008

(65) Prior Publication Data

US 2009/0276061 A1    Nov. 5, 2009

(51) Int. Cl.
G05B 15/00 (2006.01)
G05B 13/02 (2006.01)
G06F 19/00 (2011.01)
G06F 9/46 (2006.01)

(52) U.S. Cl. ............ 700/29; 700/31; 700/117; 718/106

(58) Field of Classification Search .......... 700/1, 28–29, 700/31, 36, 90, 95, 117; 718/100, 102, 106
See application file for complete search history.

(56) References Cited

U.S. PATENT DOCUMENTS

| 6,278,899 | B1 | 8/2001 | Piche et al. | |
|---|---|---|---|---|
| 6,810,506 | B1* | 10/2004 | Levy | 716/2 |
| 6,816,822 | B1* | 11/2004 | Hess et al. | 703/2 |
| 6,826,521 | B1* | 11/2004 | Hess et al. | 703/12 |
| 7,257,451 | B2 | 8/2007 | Carpency et al. | |
| 2003/0018399 | A1 | 1/2003 | Havener et al. | |
| 2004/0033617 | A1* | 2/2004 | Sonbul | 436/171 |
| 2004/0148144 | A1* | 7/2004 | Martin | 703/2 |
| 2005/0075738 | A1* | 4/2005 | Attarwala | 700/44 |
| 2005/0096769 | A1 | 5/2005 | Bayoumi et al. | |
| 2005/0288808 | A1 | 12/2005 | Lopez et al. | |
| 2007/0168057 | A1 | 7/2007 | Blevins et al. | |
| 2009/0306943 | A1* | 12/2009 | Abdel-Khalik et al. | 703/2 |

OTHER PUBLICATIONS

McKim et al. (Modular Modeling System Model Builder, IEEE, 1996.*
Dorneanu et al. (On the application of model reduction to plantwide control, 2007).*
C. Loeblein and J.D. Perkins; "Economic analysis of different structures of on-line process optimization systems"; Computers Chem. Engng vol. 22, pp. 1257-1269, 1998; 1998 Elsevier Science ltd.

* cited by examiner

*Primary Examiner* — Albert Decady
*Assistant Examiner* — Darrin Dunn (57) ABSTRACT

Methods and systems for substantially optimizing plant operations within a manufacturing environment. The method can include separating the manufacturing environment into two or more individual modules, wherein each individual module contains a fundamental principles-based model, and wherein the totality of the individual modules represents the entire manufacturing environment. Each individual module can be independently parameterized upon said module reaching steady state, wherein inter-module data flow can be provided to at least one of the individual modules during parameterization, and wherein an output of the parameterization comprises an individual, calibrated steady-state model of each individual module. A reduced order model can be derived from each parameterized module, and the reduced order models can be assembled to provide a facility reduced order model. The facility reduced order model can then be solved to provide improved or new operating conditions or operating condition targets.

17 Claims, 2 Drawing Sheets

ONLINE MODULAR PARAMETERIZATION AND SUCCESSIVE LINEAR PROGRAMMING FOR IMPROVING MANUFACTURING PLANT OPERATIONS

BACKGROUND OF THE INVENTION

1. Field of the Invention

The present invention generally relates to systems and methods for substantially optimizing plant operations within a manufacturing environment.

2. Description of the Related Art

Manufacturing facilities, in particular highly process intensive manufacturing environments, employ computer based instrumentation systems that control facility operations. Such systems typically use a steady-state, fundamental-principles control model that represents the entire facility. Accordingly, parameterization or calibration of the control model to the facility's operating conditions can only be performed when the entire facility is at a steady state.

A primary goal of typical manufacturing facility operations is to operate at or near the optimal conditions for as much of the operating time as possible. The fundamental-principles control model is the primary tool used in the optimization effort. Optimization is typically performed by iterating or re-iterating the fundamental-principles control model when process conditions change within the individual units of the facility, or when business conditions (e.g. prices, supply of raw materials, demand of intermediate/finished products) change outside of the facility, to find the optimal or substantially optimal operating conditions. Optimization can be time consuming due to the computationally intensive, large-scale, non-linear program that must be solved each time the control model is iterated. The solution of non-linear program based control model can also be difficult to understand because of the large number of unknown variables and equations within the model compared to the limited number of variables that are actually measured in the facility. Thus, trouble shooting the control model when it fails to converge can be very time consuming if not futile.

There is a need, therefore, to simplify the parameterization and optimization of a control model to reduce operating costs associated with controlling manufacturing facility processes.

SUMMARY OF THE INVENTION

Methods and systems for substantially optimizing plant operations within a manufacturing environment are provided. In at least one specific embodiment, the manufacturing environment can be separated into two or more individual modules, wherein each individual module contains a fundamental principles-based model, and wherein the totality of the individual modules represents the entire manufacturing environment. Each individual module can be independently parameterized upon said module reaching steady state, wherein inter-module data flow can be provided to at least one of the individual modules during parameterization, and wherein an output of the parameterization comprises an individual, calibrated steady-state model of each individual module. A reduced order model can be derived from each parameterized module, and the reduced order models can be assembled to provide a facility reduced order model. The facility reduced order model can then be solved to provide improved or new operating conditions or operating condition targets.

In at least one other specific embodiment, the method can include separating the manufacturing environment into two or more individual modules, wherein each individual module contains a fundamental principles-based model, and the totality of the individual modules represents the entire manufacturing environment; parameterizing each individual module, wherein an output of the parameterization comprises an individual, calibrated steady-state model of the module; linearizing each of the individual modules to provide a plurality of linearized modules, wherein linearizing each individual module comprises generating a gain matrix for each individual module, and wherein each linearized module comprises a reduced-order, linear model of a section of the facility; assembling the plurality of linearized modules to provide a facility reduced order module, wherein assembling the plurality of linearized modules comprises convoluting the gain matrices for each linearized module; determining a set of operating condition targets from the facility reduced order module; and changing one or more operating conditions within the manufacturing environment.

BRIEF DESCRIPTION OF THE DRAWINGS

So that the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

DETAILED DESCRIPTION

A detailed description will now be provided. Each of the appended claims defines a separate invention, which for infringement purposes is recognized as including equivalents to the various elements or limitations specified in the claim. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Figure 1:
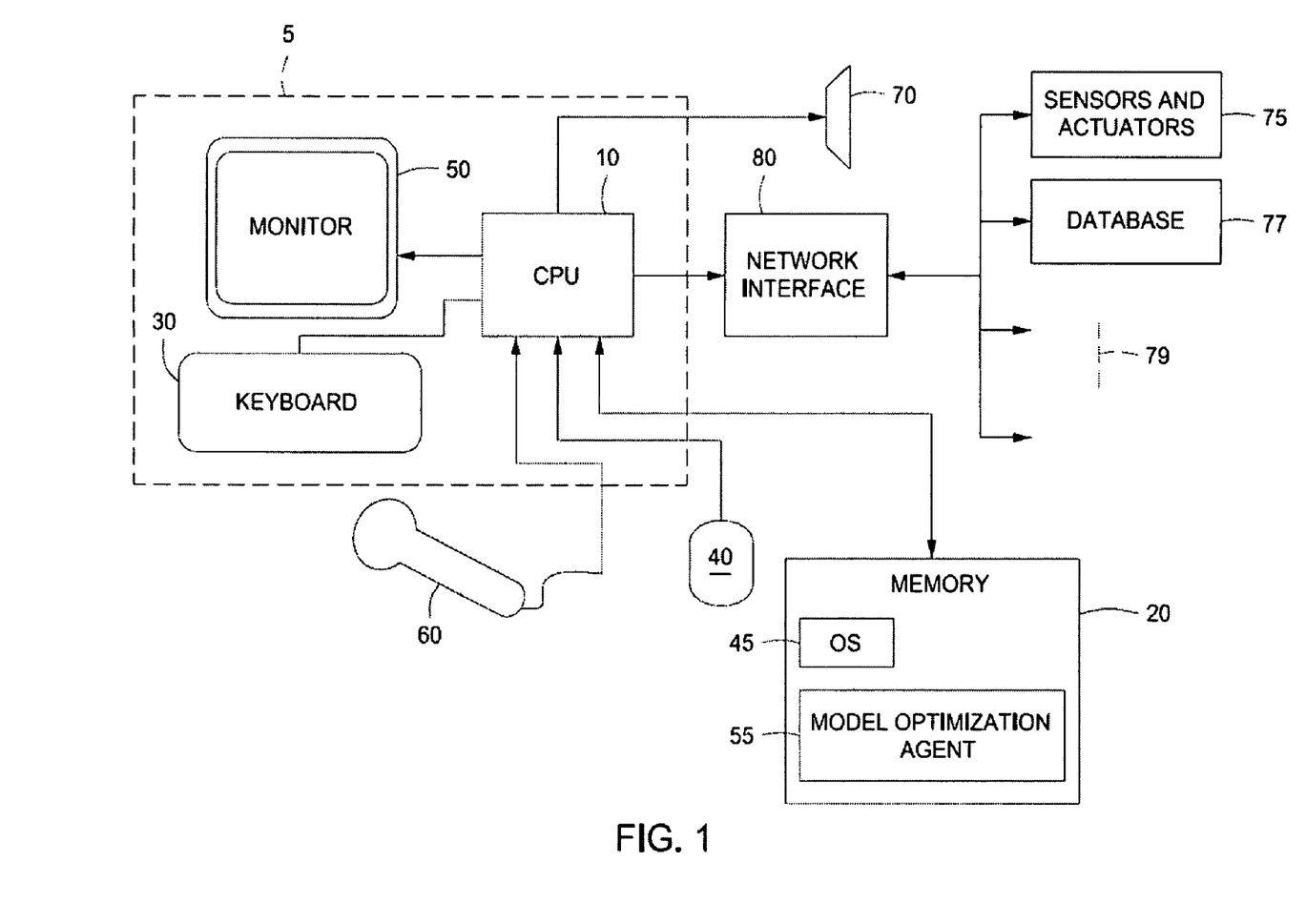
FIG. 1 depicts a representative computer system used to perform online optimization according to one or more embodiments described.

FIG. 1 depicts a representative computer system adapted to perform online optimization according to one or more embodiments. The computer 5 can include a central processing unit 10, an input device or keyboard 30, and a monitor 50. The computer 5 can also include a memory 20 as well as additional input and output devices, for example a mouse 40, a microphone 60 and a speaker 70. The mouse 40, the microphone 60 and the speaker 70 can be used for, among other purposes, universal access and voice recognition or commanding. The monitor 50 can be touch-sensitive to operate as an input device as well as a display device.

The computer system 5 can interface with database 77, one or more other databases or storage devices 79, sensors and actuators 75, and/or the internet via the network interface 80.

As used herein, the term "sensor" refers to a device used to measure a variable within the process and communicate the measurement to the control system. As used herein, the term "actuator" is a device capable of affecting the process in response to a signal from the control system. Illustrative actuators can include, but are not limited to, valves, rheostats, motors, and switches. It should be understood that the term "network interface" does not indicate a limitation to interfaces that use only Ethernet connections and refers to all possible external interfaces, wired or wireless. It should also be understood that database 77, the one or more other databases or storage devices 79, and/or the sensors and actuators 75 are not limited to interfacing with computer 5 using network interface 80 and can interface with computer 5 in any means sufficient to create a communications path between the computer 5 and database 77, one or more other databases or storage devices 79, and/or sensors and actuators 75. For example, in one or more embodiments, database 77 can interface with computer 5 via a USB interface while sensors and actuators 75 can interface via a FOUNDATION FIELDBUS interface without using the network interface 80.

It should be understood that even though the computer system 5 is shown as a platform on which the methods described can be performed, the methods described can be performed on any platform where users can interact with manufacturing facility processes, sensors, actuators, and/or machinery. For example, the many and varied embodiments described herein can be used on any device that has computing capability where users can interface and interact with any systems within a given manufacturing environment. For example, the computing capability can include the capability to access PROFIBUS, FOUNDATION FIELDBUS, or other communications bus protocols via the network interface 80 such that the user can interact with the many and varied processes or sensors and actuators within a given manufacturing environment. These devices can include, but are not limited to and are presented for illustrative purposes only: supercomputers, arrayed computer networks, distributed computer networks, desktop personal computers (PCs), tablet PCs, hand held PCs, laptops, devices sold under the trademark names BLACKBERRY™ or PALM™, cellular phones, hand held music players, or any other device or system upon which a user can interact with at least some of the systems resident in any given manufacturing environment.

Referring again to FIG. 1, one or more computer programs can be stored in the memory 20 and the central processing unit 10 can work in concert with at least the memory 20, the input device 30 and the output device 50 to perform tasks for the user. In one or more embodiments, the memory 20 includes any number and combination of memory devices, without limitation, as is currently available or can become available in the art. In one or more embodiments, memory devices can include without limitation, and for illustrative purposes only: database 77, hard drives, disk drives, random access memory, read only memory, electronically erasable programmable read only memory, flash memory, thumb drive, one or more other databases or storage devices 79, and any other memory device. Those skilled in the art are familiar with the many variations that can be employed using memory devices and no limitations should be imposed on the embodiments herein due to memory device configurations and algorithm prosecution techniques.

The memory 20 can store an operating system (OS) 45, and a model optimization agent 55. The operating system 45 can facilitate control and execution of the optimization agent 55 using the CPU 10. Any of the available operating systems can be used in this manner including WINDOWS, LINUX, Apple OS, UNIX and the like.

The CPU 10 can execute the model optimization agent 55 upon request, at scheduled intervals, when facility conditions change, or among other scenarios such as prices or supply/demand changes, to substantially optimize the facility. The model optimization agent 55 can utilize a distributed approach to control and optimize the manufacturing process environment or manufacturing facility. Based on the distributed approach, the model optimization agent 55 can change the operating conditions within the facility by directing or actuating one or more actuators 75 within the facility. A more detailed discussion of an illustrative distributed approach is provided below with reference to FIG. 2.

Figure 2:
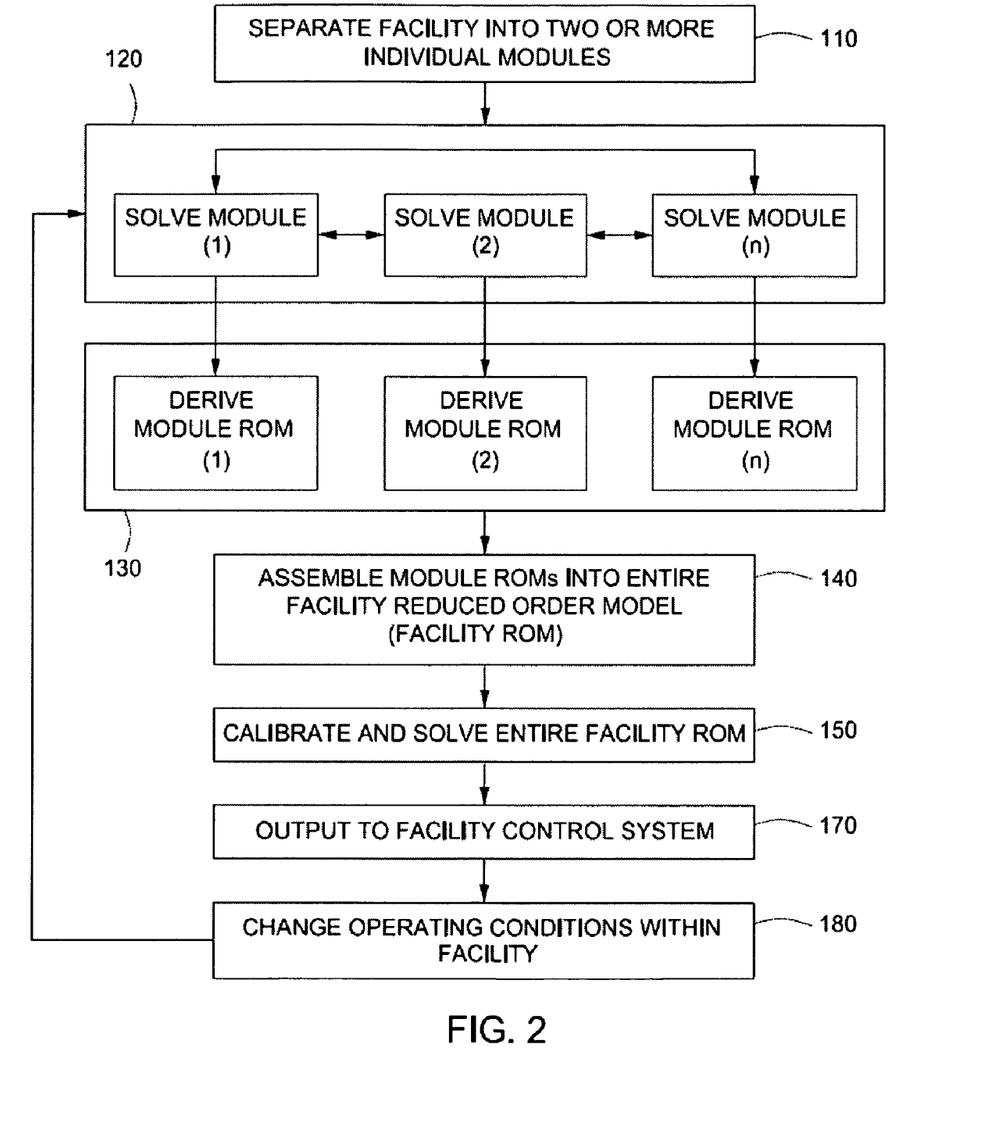
FIG. 2 is a flow diagram for substantially optimizing plant operations within a manufacturing environment, according to one or more embodiments described.

FIG. 2 depicts a flow diagram of an illustrative distributed approach to the parameterization of individual modules and use of a reduced order model to decrease size of an optimization problem to operate a manufacturing facility, according to one or more embodiments. Referring to FIG. 2, a manufacturing environment ("plant facility") can be segregated into two or more individual modules (step 110). Each module can include or represent a fundamental principles-based model of a single unit operation, two or more unit operations, or a section of the plant facility. For example, a first module can be or include a model of a reactor within the plant facility, a second module can be or include a model of a multi-phase separation process within the same plant facility, and so on until all the individual equipment or unit operation(s) ("processes") of interest within the facility are represented by at least one individual module.

The facility can be any unit or process that is adapted to refine, purify, convert, consume, or otherwise process any material to produce a desired product. The facility can include, but is not limited to, petroleum refineries, catalytic and steam crackers, petrochemical plants, other chemical plants (i.e., chemical plants that are not based on petrochemicals), facilities for converting natural gas and/or methanol into other hydrocarbons, natural gas liquefaction plants, polymer and plastics plants, steel mills, pharmaceutical manufacturing plants, and electric power generating plants. In some cases, a facility can include two or more separate facilities, such as a petroleum refinery together with one or more steam crackers.

In one or more embodiments, the facility can include a plurality of separate process units or sections of process units that function together to achieve the overall objective of the facility. As used herein, a "process unit" is an apparatus or device that performs a specific function, such as a process gas compressor unit, a fractionator, a reformer, a hydrotreater, a distillation column, a quench tower, a de-ethanizer, a cogeneration unit, or a refrigeration unit, and a "section" of process units is a grouping of two or more associated process units.

In step 110, the selection or identity of an individual module can be based on process characteristics. In one or more embodiments, the selection or identity of an individual module 110 can be based on the relative speed at which the process described by the module can respond to inputs and reach a steady state. In other words, sections of the facility that are relatively quick-responding can be grouped into one module and comparatively slower responding sections can be grouped into another module.

In step 120, each individual module from step 110 can be solved or parameterized when the section of the facility represented by that module reaches steady state. The time to reach steady state for a given section can be the same or different as another section. The time to reach steady state for a given module or groups or two or more modules can depend on many factors including weather conditions, fouling, operating error, maintenance, etc. Upon each module reaching steady state, each module can then be solved, i.e. parameterized. By separating the facility in step 110 into individual modules to be parameterized in step 120, a more rigorous and high fidelity first-principles model can be applied to each module without creating computing complexity. As such, more accurate results can be obtained at much faster rates so that the entire facility can be optimized or substantially optimized more frequently, even if the entire facility is not at steady state.

In step 120, each module can be solved independently and asynchronously from another module. Information from any given module can be shared to any one or more other modules to assist in parameterization. In some cases, parameterization of any given module can require information from one or more other modules. For example, an individual module may need data about the unmeasured stream composition coming from another individual module and the unmeasured stream composition information can be passed up and/or down the flow path such that the individual module requiring the data can be parameterized. Accordingly, inter-module data from one module can be provided to one or more other modules when those individual modules are being parameterized in step 120. Subject to conditions on the timeliness of the inter-module data flow during step 120, one or more individual modules can be parameterized at a higher frequency than the other individual modules because one or more of the individual modules can have faster times to steady state than other individual modules. Since sections of a facility can reach steady state before the entire facility, the individual modules for these sections can be parameterized more quickly than the entire facility model.

After initial parameterization in step 120, a reduced order model ("Module ROM") of each individual module can be derived (step 130). The Module ROM can be an input/output representation of the individual module. In step 130, the Module ROMs can be linear and can be derived from the individual modules of step 120 using a matrix algebraic operation.

A linear Module ROM can be obtained by converting a full state variable Jacobian matrix (J) to an input-output Sensitivity matrix or Gain matrix (G). A gain matrix can be calculated for each module of step 120, and can contain the simplified relationships between relevant outputs and inputs for each Module ROM. In one or more embodiments, relevant outputs for each Module ROM can include material and/or energy stream data that can be input to other Module ROMs. The gain matrix can be used as a reduced order model and can be accurate in the local region of the current operating point for any given module. The reduced order model can be updated when each module is parameterized as the operating point changes.

The input variables to each Module ROM can be designated as "u" and can represent manipulated (operational degrees-of-freedom) and disturbance (output from other modules) variables within the module. The output variables from each Module ROM can be designated as "y" and can represent measured and inferred states (unmeasured) variables, as well as objective function elements.

Given the input and output variables, a reduced-order linear model can be derived by calculating the gain matrix ($\partial y/\partial u$) from a Jacobian matrix ($\partial f/\partial x$) of each module. Table 1 shows an illustrative structure of a Jacobian matrix (J), where F denotes a set of equations, and X denotes a set of variables describing the process. Note that X comprises of both input (u) and output (y) variables. Table 2 shows the decomposition of the Jacobian matrix into input ($J_u$) and output ($J_y$) components. Table 3 shows an illustrative structure of the resulting gain matrix.

TABLE 1

Jacobian matrix (J)

| | $X_1$ | $X_2$ | ... | $X_n$ |
|---|---|---|---|---|
| $F_1$ | $\dfrac{\partial F_1}{\partial X_1}$ | $\dfrac{\partial F_1}{\partial X_2}$ | ... | $\dfrac{\partial F_1}{\partial X_n}$ |
| $F_2$ | $\dfrac{\partial F_2}{\partial X_1}$ | $\dfrac{\partial F_2}{\partial X_2}$ | ... | $\dfrac{\partial F_2}{\partial X_n}$ |
| ⋮ | ⋮ | ⋮ | | ⋮ |
| $F_m$ | $\dfrac{\partial F_m}{\partial X_1}$ | $\dfrac{\partial F_m}{\partial X_2}$ | ... | $\dfrac{\partial F_m}{\partial X_n}$ |

TABLE 2

Decomposition of Jacobian matrix into input ($J_u$) and output ($J_y$) components.

| | $y_1$ | $y_2$ | ... | $y_m$ | $u_1$ | $u_2$ | ... | $u_{n-m}$ |
|---|---|---|---|---|---|---|---|---|
| $F_1$ | $\dfrac{\partial F_1}{\partial y_1}$ | $\dfrac{\partial F_1}{\partial y_2}$ | | $\dfrac{\partial F_1}{\partial y_m}$ | $\dfrac{\partial F_1}{\partial u_1}$ | $\dfrac{\partial F_1}{\partial u_2}$ | | $\dfrac{\partial F_1}{\partial u_{n-m}}$ |
| $F_2$ | $\dfrac{\partial F_2}{\partial y_1}$ | $\dfrac{\partial F_2}{\partial y_2}$ | ... | $\dfrac{\partial F_2}{\partial y_m}$ | $\dfrac{\partial F_2}{\partial u_1}$ | $\dfrac{\partial F_2}{\partial u_2}$ | ... | $\dfrac{\partial F_2}{\partial u_{n-m}}$ |
| ⋮ | ⋮ | ⋮ | | ⋮ | ⋮ | ⋮ | | ⋮ |
| $F_m$ | $\dfrac{\partial F_m}{\partial y_1}$ | $\dfrac{\partial F_m}{\partial y_2}$ | ... | $\dfrac{\partial F_m}{\partial y_m}$ | $\dfrac{\partial F_m}{\partial u_1}$ | $\dfrac{\partial F_m}{\partial u_2}$ | ... | $\dfrac{\partial F_m}{\partial u_{n-m}}$ |

TABLE 3

Gain matrix (G)

| | $y_1$ | $y_2$ | ... | $y_m$ |
|---|---|---|---|---|
| $u_1$ | $\dfrac{\partial y_1}{\partial u_1}$ | $\dfrac{\partial y_2}{\partial u_1}$ | ... | $\dfrac{\partial y_m}{\partial u_1}$ |
| $u_2$ | $\dfrac{\partial y_1}{\partial u_2}$ | $\dfrac{\partial y_2}{\partial u_2}$ | ... | $\dfrac{\partial y_m}{\partial u_2}$ |
| ⋮ | ⋮ | ⋮ | | ⋮ |
| $u_{n-m}$ | $\dfrac{\partial y_1}{\partial u_{n-m}}$ | $\dfrac{\partial y_2}{\partial u_{n-m}}$ | ... | $\dfrac{\partial y_n}{\partial u_{n-m}}$ |

Accordingly, the gain matrix can be represented and is commonly known in the art, as follows:

$$[G]^T = -[J_y]^{-1} * [J_u]$$

In step 140, the individual Module ROMs from step 130 can be combined or otherwise assembled into a mathematical representation of the entire facility to provide a facility reduced order model ("Facility ROM"). Inputs to the Facility ROM can be estimates for the steady state of the entire facility. As such, the entire facility need not be in steady state at the time the individual Module ROMs are assembled to provide the Facility ROM and to optimize the Facility ROM.

The Facility ROM in step 140 can be assembled by convoluting the gain matrices for each Module ROM derived in step 130. The convolution of the gain matrices can be achieved by connecting inputs of one module and outputs of another module to define one or more interface streams between the connected modules. For example, the convolution of the gain matrices, e.g. $(\partial y/\partial u)_1$ and $(\partial y/\partial u)_2$, using an interface stream ($y_1/u_2$) across Module ROM$_1$ and Module ROM$_2$ can be expressed as shown in the following Formula I.

$$\frac{\partial(y)_2}{\partial(u)_1} = \sum \frac{\partial(y)_2}{\partial(u)_2} \times \frac{\partial(y)_1}{\partial(u)_1} \quad \text{(I)}$$

In Formula I, (y, u)$_1$ represents outputs and inputs from module 1; (y, u)$_2$ represents outputs and inputs from module 2; and ($y_1, u_2$) represents an interface stream between module 1 and module 2.

In step 150, the Facility ROM from step 140 can be calibrated and solved. Any linear or non-linear programming technique can be used. The results from the calibrated and solved Facility ROM can then be used to improve the facility operations. For example, the facility reduced order model can be solved to provide new or improved operating conditions or operating condition targets.

In step 170, the Facility ROM can output to the facility control system. The facility control system can change the operating conditions within the manufacturing environment by actuating one or more actuators 75 (shown in FIG. 1), i.e. control valves, within the environment to improve or optimize the facility operation in step 180. In doing so, for example, the facility control system can utilize a single loop controller or a multivariable software application to manipulate the actuators 75.

The outcome of step 180 results in new inputs to the individual modules of step 120. The individual modules can then be solved or re-parameterized. Based on the output of the re-parameterization, the Module ROMs can be updated (step 130), and the Facility ROM can be updated (step 140) and re-calibrated (step 150). From the updated Facility ROM, new facility operating conditions can be determined and output to the facility control system (step 170) where the outcome (step 180) results in new inputs to the individual modules (step 120). Steps 120 through step 180 can be repeated, on a scheduled basis, as desired by a user, or automatically as plant conditions change.

According to one or more embodiments described, the modularization of the facility can enable the parameterization of a given module at a higher frequency than parameterization of a model of the entire plant operations because sections of the facility can reach steady state more quickly than the entire facility. The modularization can also be performed based on the rate at which different sections of a given facility reach steady state.

The foregoing discussion can be further described with reference to the following prophetic example. For simplicity and ease of description, the following notation and parameter values are used:

c—Concentration, kg-mole/m$^3$ k—Reaction Rate Constant, /s($k_A$=2.7×10$^8$/s; $k_B$=160/s)

q—Cooling Rate, m$^3$(° K)/s r—Reaction Rate, kg-mole/s

E/R—Activation Energy, ° K ($E_A$/R=6000° K; $E_B$/R=4500° K)

$\Delta H_R/(\rho Cp)$—Heat of Reaction, m$^3$(° K)/kg-mole $\Delta H_{R,A}/(\rho Cp)$=5 m$^3$(° K)/kg-mole $\Delta H_{R,B}/(\rho Cp)$=5 m$^3$(° K)/kg-mole LMTD—Log Mean Temperature Difference, ° K Q—Volumetric Flowrate, m$^3$/s T—Temperature, ° K UA—Heat Transfer Coefficient for Reactors, m$^3$/s(0.35 m$^3$/s)

V—Reactor Volume, 5 m$^3$

Subscripts:

cw—Cooling Water i—Inlet o—Outlet

A,B,C—for components A,B,C

F,F1,F2—Feed Stream

P—Product Stream

W—for Water

Considering a system of reactors where reactant A is converted to product B, and byproduct C, as illustrated by the following reaction mechanism:

A  B

B  C the system can include at least two reactors RX1 and RX2 and a mixer MX. A first-principles model describing such reactors can be described as follows:

Overall Mass Balance:

$Q_P = Q_F$

Component Mass Balances:

$Q_P \times c_{A,P} = Q_F \times c_{A,F} - r_A$ $Q_P \times c_{B,P} = Q_F \times c_{B,F} + r_A - r_B$ $Q_P \times c_{C,P} = Q_F \times c_{C,F} + r_B$ Reaction Rates:

$r_A = c_{A,P} \times V \times k_A^{(-E_A/RT)}$ $r_B = c_{B,P} \times V \times k_B^{(-E_B/RT)}$ Energy Balance:

$Q_P \times T_P = Q_F \times T_F - (\Delta H_{R,A}/\rho Cp) \times r_A - (\Delta H_{R,B}/\rho Cp) \times r_B - q_{cw}$ $q_{cw} = Q_W \times (T_{W,o} - T_{W,i})$ Heat Transfer Rate:

$q_{cw} = UA \times \text{LMTD}$ $\text{LMTD} = (T_{W,o} - T_{W,i})/\ln\{(T_P - T_{W,i})/(T_P - T_{W,o})\}$ A first-principles model describing the mixer MX can be described as follows:

Overall Mass Balance:

$Q_P = Q_{F1} + Q_{F2}$

Component Mass Balances:

$Q_P \times c_{A,P} = Q_{F1} \times c_{A,F1} + Q_{F2} \times c_{A,F2}$ $Q_P \times c_{B,P} = Q_{F1} \times c_{B,F1} + Q_{F2} \times c_{B,F2}$ $Q_P \times c_{C,P} = Q_{F1} \times c_{C,F1} + Q_{F2} \times c_{C,F2}$ Energy Balance:

$Q_P \times T_P = Q_{F1} \times T_{F1} + Q_{F2} \times T_{F2}$

The system can further include the following operational constraints:

A. Safety:

$RX1: T_P \leq 350°$ K $RX2: T_P \leq 350°$ K

B. Raw Materials Supply:

$RX1: Q_F + MX: Q_{F2} \leq 0.8$ m$^3$/s

C. Process Restrictions:

$$RX1{:}T_{W,o} \leq 330° \text{ K}$$

$$RX2{:}T_{W,o} \leq 300° \text{ K}$$

D. Product Specifications:

$$RX2{:}c_{A,P} \leq 0.3 \text{ kg-mole/m}^3$$

If the objective of the system is to maximize operating profit by manipulating $RX1{:}Q_F$ and $MX{:}Q_{F2}$, and if profitability is calculated as:

$$\Phi = 10 \times [RX1{:}Q_F \times RX1{:}c_{A,F} + MX{:}Q_{F2} \times MX{:}c_{A,F2} - RX2{:}Q_P \times (RX2{:}c_{A,P} + RX2{:}c_{C,P})] - 0.01 \times RX1{:}q_{cw} - RX2{:}q_{cw} - RX1{:}Q_F - MX{:}Q_{F2}$$

then an optimal solution for the system when solved using traditional nonlinear programming techniques can be determined as follows:

$$\Phi = 82.84$$

with:

$$RX1{:}Q_F = 0.276$$

$$MX{:}Q_{F2} = 0.234$$

According to one or more embodiments described, the system can be separated into two modules, Module 1 representing the first reactor RX1, and Module 2 representing the mixer MX and the second reactor RX2. Module 1 does not require information from module 2. However, Module 2 requires $MX{:}Q_{F1}$, $MX{:}T_{F1}$, $MX{:}c_{A,F1}$, $MX{:}c_{B,F1}$ and $MX{:}c_{C,F1}$ variables from the reactor RX1 in the Module 1. These variables are the same as $RX1{:}Q_P$, $RX1{:}T_P$, $RX1{:}c_{A,P}$, $RX1{:}c_{B,P}$ and $RX1{:}c_{C,P}$ respectively.

Inputs $u_1$ for Module 1 should include (a) the operational degrees of freedom within the scope of Module 1, i.e., $RX1{:}Q_F$, and (b) the interface stream elements that are output from Module 2, but are input to Module 1, i.e. none in this case.

Outputs $y_1$ for Module 1 should include (a) operational constraints (excluding those on inputs) within the scope of Module 1, i.e., $RX1{:}T_P$ and $RX1{:}T_{W,o}$; and (b) interface stream elements described above, i.e., $RX1{:}Q_P$, $RX1{:}T_P$, $RX1{:}c_{A,P}$, $RX1{:}c_{B,P}$ and $RX1{:}c_{C,P}$, and (c) Objective function components within the scope of Module 1, i.e., $$1.\text{Obj} = 10 \times [RX1{:}Q_F \times RX1{:}c_{A,F}] - 0.01 \times RX1{:}q_{cw} - RX1{:}Q_F$$

Based on the above description, the unique set of inputs $u_1$ can include:
$RX1{:}Q_F$
and the unique set of outputs $y_1$ can include:
1.Obj
$RX1{:}Q_P$
$RX1{:}T_P$
$RX1{:}c_{A,P}$
$RX1{:}c_{B,P}$
$RX1{:}c_{C,P}$
$RX1{:}T_{W,o}$
Similarly, the unique set of inputs $u_2$ for Module 2 can include:
$MX{:}Q_{F1}$
$MX{:}T_{F1}$
$MX{:}c_{A,F1}$
$MX{:}c_{B,F1}$
$MX{:}c_{C,F1}$
$MX{:}Q_{F2}$ and, the unique set of outputs $y_2$ for Module 2 can include:
2.Obj
$MX{:}Q_P$
$RX2{:}T_P$
$RX2{:}c_{A,P}$
$RX2{:}T_{W,o}$ When the Module 1 is solved using

| RX1:QF | 0.225 |
|---|---| the following values for $y_1$ are obtained:

| 1:Obj | 44.85345 |
|---|---|
| RX1:QP | 0.225 |
| RX1:TP | 345.038 |
| RX1:cAP | 0.118149 |
| RX1:cBP | 19.7298 |
| RX1:cCP | 0.152033 |
| RX1:TWOut | 317.721 |

It is to be noted that since Module 1 is a first-principles model of reactor RX1, the actual inputs and outputs can include more variables than those included above. However, for the sake of clarity, only the variables of interest are discussed.

When Module 2 is solved using

| MX:Q1G | 0.225 |
|---|---|
| MX:T1F | 345.038 |
| MX:cA1F | 0.118149 |
| MX:cB1F | 19.7298 |
| MX:cC1F | .0152033 |
| MX:Q2F | 0.225 | the following values for $y_2$ are obtained:

| 2:Obj | 26.93512 |
|---|---|
| MX:QP | 0.45 |
| RX2:TP | 335.232 |
| RX2:cAP | 0.194964 |
| RX2:TWOut | 298.7 |

Again, only the variables of interest are displayed.

In order to generate a Reduced Order Model for Module 1, the following gain matrix can be used to represent $(y_1, u_1)$ relationships.

|  | Obj | RX1:QP | RX1:TP | RX1:cAP | RX1:cBP | RX1:cCP | RX1:TWOut |
|---|---|---|---|---|---|---|---|
| RX1:QF | 200.2040023 | 1 | 110.374 | −0.131341 | 0.171436 | −0.0400949 | 43.4289 |

Similarly, a Reduced Order Model for Module 2 can be generated using the following gain matrix to represent $(y_2, u_2)$ relationships.

|  | Obj | MX:QP | RX2:TP | RX2:cAP | RX2:TWOut |
|---|---|---|---|---|---|
| MX:Q1F | −6.68293 | 1 | 13.513 | −0.141241 | 5.31696 |
| MX:T1F | −0.0770433 | 0 | 0.322465 | −0.00329151 | 0.12688 |
| MX:cA1F | −0.428141 | 0 | 1.58522 | −0.00649001 | 0.623737 |
| MX:cB1F | −0.00691493 | 0 | 0.00423084 | 4.32E−05 | 0.00166471 |
| MX:cC1F | −2.25 | 0 | 0 | 0 | 0 |
| MX:Q2F | 172.933 | 1 | 88.671 | −0.0520766 | 34.8893 |

From the two gain matrices above, a Reduced Order Model (ROM) of the facility can be obtained by connecting an appropriate output elements of $y_1$ with an appropriate input elements of $u_2$ (convolution using interface stream) as follows.

$\Delta$ = (Optimized Value − Base Value)

When the facility ROM above is used for calculating operational targets to improve the objective function, subject to operational constraints, the system objective function can be improved to:

$\Phi = 82.27 (\Delta = 10.48)$ with $RX1{:}Q_F = 0.270 (\Delta = 0.0449562)$ $MX{:}Q_{F2} = 0.237 (\Delta = 0.0124698)$ Implementing these targets, and repeating the steps again, the system can approach or eventually reach its optimal state, in this case, where:

$\Phi = 82.84$ and $RX1{:}Q_F = 0.276$ $MX{:}Q_{F2} = 0.234$

Those skilled in the art will understand that there are many computer system configurations, and it should be understood that the computer system 5 presented in FIG. 1 is not meant to limit the configurations and variations within which the many embodiments, including those described below with reference to FIG. 2, can be employed.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for substantially optimizing plant operations within a manufacturing environment, comprising:

separating the manufacturing environment into two or more individual modules, wherein each individual module contains a fundamental principles-based model, and wherein said two or more individual modules represent the manufacturing environment;

independently parameterizing each individual module upon said module reaching steady state;
wherein inter-module data flow is provided to at least one of the individual modules during parameterization; and
wherein an output of the parameterization comprises an individual, calibrated steady-state model of each individual module;

deriving a reduced order model from each parameterized module;

assembling the reduced order models to provide a facility reduced order model;

determining improved operating condition targets from the facility reduced order model; and changing one or more operating conditions within the manufacturing environment based on the improved operating condition targets.

2. The method of claim 1 wherein the step of independently parameterizing each individual module can be performed on at least one of the individual modules asynchronously from the other individual modules.

3. The method of claim 1 wherein at least one of the individual modules represents a section of the manufacturing environment that reaches steady state faster than at least one other section of the manufacturing environment.

4. The method of claim 1 further comprising:
linearizing at least one of the individual modules;
wherein each linearized module comprises a reduced-order, linear model of a section of the facility.

5. The method of claim 1 further comprising:
determining the state of a material or energy stream that is output from an individual module, and
providing the state of the stream as an input to another individual module.

6. The method of claim 1 further comprising operating the entire manufacturing environment using the improved operating conditions.

7. The method of claim 1 wherein deriving a reduced order model from each parameterized module comprises generating a gain matrix for each individual module.

8. A method for substantially optimizing plant operations within a manufacturing environment, comprising:
separating the manufacturing environment into two or more individual modules, wherein each individual module contains a fundamental principles-based model, and wherein said two or more individual modules represent the manufacturing environment;
independently parameterizing each individual module upon said module reaching steady state;
deriving a reduced order model from each parameterized module;
assembling the reduced order models to provide a facility reduced order model;
determining improved operating condition targets from the facility reduced order model;
and changing one or more operating conditions within the manufacturing environment based on the improved operating condition targets;
wherein inter-module data flow is provided to at least one of the individual modules during parameterization;
wherein an output of the parameterization comprises an individual, calibrated steady-state model of each individual module;
wherein deriving a reduced order model from each parameterized module comprises generating a gain matrix for each individual module; and
wherein assembling the reduced order models comprises convoluting the gain matrices for each linearized module.

9. The method of claim 8 wherein operating the entire manufacturing environment comprises:
determining a set of operating condition targets at a first time interval from the facility reduced order model;
changing the operating conditions within the manufacturing environment;
measuring the manufacturing environment responses to the changed operating conditions;
re-parameterizing the individual modules;
re-deriving the reduced order model from each re-parameterized module;
re-assembling the re-derived reduced order model to provide a new facility reduced order model; and
determining a set of operating condition targets at a second time interval from the re-assembled facility reduced order model.

10. The method of claim 1 wherein the new facility reduced order module is an updated reduced order module.

11. A method for substantially optimizing plant operations within a manufacturing environment, comprising:
separating the manufacturing environment into two or more individual modules, wherein each individual module contains a fundamental principles-based model, and said two or more individual modules represent the manufacturing environment;
parameterizing each individual module, wherein an output of the parameterization comprises an individual, calibrated steady-state model of the module;
linearizing each of the individual modules to provide a plurality of linearized modules, wherein linearizing each individual module comprises generating a gain matrix for each individual module, and wherein each linearized module comprises a reduced-order, linear model of a section of the facility;
assembling the plurality of linearized modules to provide a facility reduced order module, wherein assembling the plurality of linearized modules comprises convoluting the gain matrices for each linearized module;
determining a set of operating condition targets from the facility reduced order module; and
changing one or more operating conditions within the manufacturing environment based on said set of operating condition targets.

12. The method of claim 11, further comprising measuring the manufacturing environment responses to the changed operating conditions and re-parameterizing the individual modules.

13. The method of claim 12, further comprising:
re-assembling the plurality of linearized modules to provide a new facility reduced order module; and
determining a new set of operating condition targets.

14. The method of claim 13, wherein the new facility reduced order module is an updated reduced order module.

15. The method of claim 13, further comprising changing one or more operating conditions within the manufacturing environment based on the new set of operating condition targets.

16. An apparatus for substantially optimizing plant operations within a manufacturing environment, comprising:
means for providing a model optimization agent with a plurality of individual linearized modules, wherein each individual module contains a fundamental principles-based model of a section of a manufacturing environment and wherein said plurality of individual linearized modules represents the manufacturing environment;

means for parameterizing each individual module;

means for assembling the plurality of linearized modules; and means for determining improved operating condition targets for the entire manufacturing environment using the combined modules;

wherein inter-module data flow is provided to at least one of the individual modules during parameterization;

wherein an output of the parameterization comprises an individual, calibrated steady-state module of each individual module; and wherein the means for assembling the plurality of linearized modules comprises means for convoluting the gain matrices for each linearized module.

17. The method of claim 11, wherein the step of parameterizing each individual module can be performed on at least one of the individual modules asynchronously from the other individual modules.

* * * * *